United States Patent
Kang

(10) Patent No.: US 9,535,508 B2
(45) Date of Patent: Jan. 3, 2017

(54) KEY INPUT METHOD IN PORTABLE TERMINAL

(71) Applicant: Samsung Electronics Co., Ltd., Suwon-si, Gyeonggi-do (KR)

(72) Inventor: Chang-Taek Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 312 days.

(21) Appl. No.: 13/957,798

(22) Filed: Aug. 2, 2013

(65) Prior Publication Data

US 2014/0037211 A1 Feb. 6, 2014

(30) Foreign Application Priority Data

Aug. 6, 2012 (KR) .................. 10-2012-0085863

(51) Int. Cl.
G06K 9/00 (2006.01)
G06F 3/02 (2006.01)
G06F 3/0488 (2013.01)

(52) U.S. Cl.
CPC ............ G06F 3/02 (2013.01); G06F 3/04883 (2013.01)

(58) Field of Classification Search
CPC ........................................... G06F 3/02
USPC ...................................... 382/189
See application file for complete search history.

(56) References Cited

U.S. PATENT DOCUMENTS

| 5,698,822 A * | 12/1997 | Haneda ............... G06F 3/04883 178/18.01 |
| 5,774,582 A * | 6/1998 | Gat ......................... G06K 9/32 382/177 |
| 6,661,409 B2 * | 12/2003 | Demartines ........... G06F 3/0485 345/173 |
| 2008/0240569 A1 * | 10/2008 | Tonouchi ........... G06K 9/00402 382/186 |
| 2009/0116744 A1 * | 5/2009 | Woo ..................... G06K 9/6255 382/187 |
| 2011/0157615 A1 * | 6/2011 | Rimai ................... G06F 17/214 358/1.11 |
| 2012/0007825 A1 * | 1/2012 | Kim ....................... G06F 3/041 345/174 |
| 2012/0020566 A1 * | 1/2012 | Yamanouchi ......... G06F 1/1694 382/187 |
| 2014/0111440 A1 * | 4/2014 | Garside ............... G06F 3/03545 345/168 |
| 2014/0292702 A1 * | 10/2014 | Samejima ........... G06F 3/04883 345/173 |

FOREIGN PATENT DOCUMENTS

KR 10-2009-0046142 A 5/2009

* cited by examiner

*Primary Examiner* — Edward Park
*Assistant Examiner* — Delomia L Gilliard
(74) *Attorney, Agent, or Firm* — Jefferson IP Law, LLP

(57) ABSTRACT

A method of inputting keys in a portable terminal is provided. The method includes receiving a handwriting, identifying an input size of the handwriting and a reference size, and as a result of the identification, if a size difference between the input size of the handwriting and the reference size is less than a predetermined difference, converting the handwriting into a text having a text size corresponding to the reference size.

29 Claims, 7 Drawing Sheets

KEY INPUT METHOD IN PORTABLE TERMINAL

PRIORITY

This application claims the benefit under 35 U.S.C. §119 (a) of a Korean patent application filed on Aug. 6, 2012 in the Korean Intellectual Property Office and assigned Serial No. 10-2012-0085863, the entire disclosure of which is incorporated herein by reference.

BACKGROUND OF THE INVENTION

1. Field of the Invention

The present invention relates generally to portable terminals. More particularly, the present invention relates to a method of enabling to more conveniently use handwriting input through a touch pen in the portable terminal.

2. Description of the Related Art

As portable terminals evolve into various forms, such as smartphones or tablets, they provide user with many useful functions, which leads to widespread use of the portable terminals.

In particular, smartphones or tablets, multi-functional devices, for using multimedia and playing games have increased in popularity and are being widely used in many settings.

However, due to a lack of physical keyboards, most smartphones or tablets are inconvenient for use in some productive functions, such as document creation, as compared to an electronic device with the physical keyboard, such as a notebook.

To resolve this inconvenience, recent portable terminals provide touch pens for recognizing a pen input from the user on touch screens so that the user can conveniently use the portable terminal for a function such as a document creation or a drawing function.

A conventional technology for the document creation with the touch pen includes a technology for storing handwritings input by the user in an image format, or a technology for converting the handwritings input by the user into machine readable texts with a text recognition function.

However, in the case of the conventional technology for converting the handwritings input by the user into the texts, no matter how large the handwriting is, the handwriting is always converted into the same sized text. Thus, if the user wants to change the text size, the user must subsequently adjust the text size in a menu.

Therefore, in the case of using a handwriting input through the touch pen and converting the handwriting into a text, a method of easily changing the size of the converted text (e.g., the font size) without a need for establishing e.g., a separate menu, is required.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention supplements a conventional method of document creation with a touch pen and thus provides a method of allowing a user to more conveniently set up a size of a text when the text is entered by using the touch pen.

In accordance with an aspect of the present invention, a method of inputting keys in a portable terminal is provided. The method includes receiving handwriting, identifying an input size of the handwriting and a reference size, and as a result of the identification, if a size difference between the input size of the handwriting and the reference size is less than a predetermined difference, converting the handwriting into a text having a text size corresponding to the reference size.

In accordance with another aspect of the present invention, a method of inputting keys in a portable terminal is provided. The method includes receiving a first handwriting, setting an input size of the first handwriting as a reference size, and converting the first handwriting into a first text having a text size corresponding to the reference size, identifying an input size of a second handwriting input after the first handwriting, and as a result of the identification, if a difference between the input size of the second handwriting and the reference size is less than a predetermined difference, converting the second handwriting into a second text having a text size corresponding to the reference size.

In accordance with another aspect of the present invention, a method of inputting keys in a portable terminal is provided. The method includes if a handwriting-to-text conversion mode is entered, displaying one or more reference lines in a handwriting input region, receiving a handwriting and identifying a number of the reference lines that the handwriting intersects, and converting the handwriting into a text having a text size corresponding to the number of the reference lines that the handwriting intersects.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
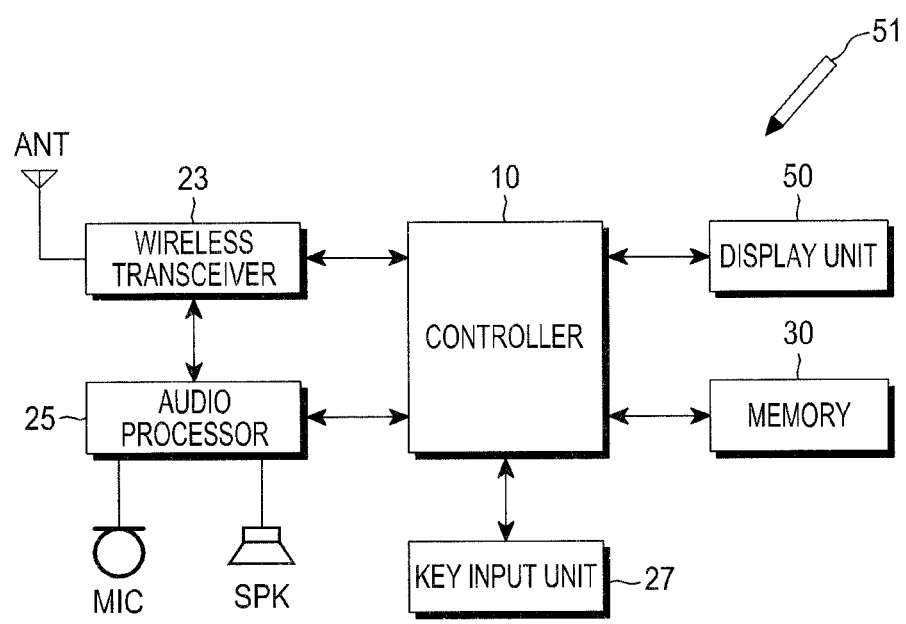
FIG. 1 is a block diagram of a portable terminal according to an exemplary embodiment of the present invention.

FIG. 1 is a block diagram of a portable terminal according to an exemplary embodiment of the present invention.

In an exemplary embodiment of the present invention, a portable terminal is an easy-to-carry electronic device including videophones, cell phones, smartphones, International Mobile Telecommunication 2000 (IMT-2000) terminals, Wideband Code Division Multiple Access (WCDMA) terminals, Universal Mobile Telecommunication Service (UMTS) terminals, Personal Digital Assistants (PDAs), Portable Multimedia Players (PMPs), Digital Multimedia Broadcasting (DMB) terminals, E-Book readers, portable computers (e.g., notebook, Tablet, etc.), digital cameras, or the like, which will now be described with reference to FIG. 1.

A wireless transceiver 23 includes a Radio Frequency (RF) unit and a modem. The RF unit includes an RF transmitter for up converting the frequency of a signal to be transmitted and amplifying the signal, and an RF receiver for low-noise amplifying a received signal and down converting the frequency of the received signal. The modem includes a transmitter for encoding and modulating the signal to be transmitted and a receiver for demodulating and decoding the signal received from the RF unit.

An audio processor 25 may include a codec that having a data codec and an audio codec. The data codec processes general data e.g., packet data, and the audio codec processes audio and multimedia data e.g., sound and multimedia files. The audio processor 25 converts digital signals into analog signals and reproduces the analog signals with the audio codec, or converts analog signals input through a microphone to digital audio signals with the audio codec and transmits the converted input to the modem. The audio codec may be separately included in the portable terminal, or may be incorporated into a controller 10 of the portable terminal.

Using the audio processor 25, the controller 10 may convert an input handwriting into a text, and then output the input conversion result (the text) as a sound to a user. By the sound, the user may aurally confirm whether his/her handwriting has been correctly recognized and entered as the text.

A key input unit 27 may include keys for entering alphanumeric information and function keys for establishing various functions, or a touch pad for touch input such as handwriting. If a display unit 50 is implemented with a touch screen, the key input unit 27 may include only a predetermined minimum number of keys and the display unit 50 may implement some key functions of the key input unit 27.

After entering his/her handwriting via the touch input, the user may also enter a text using the key input unit 27 before completion of the conversion of his/her handwriting into a text. For example, when the input handwriting does not match the user's intended input, the user may enter the text with the key input unit 27 to correct the text.

A memory 30 may consist of a program memory and a data memory, and the program memory stores a program to control general operations of the portable terminal. The memory 30 may further include an external memory, such as Compact Flash (CF), Secure Digital (SD), Micro Secure Digital (Micro-SD), Mini Secure Digital (Mini-SD), extreme Digital (xD), memory stick, and the like. The memory 30 may also include a disc, such as Hard Disc Drive (HDD), Solid State Disc (SSD), and the like. The memory 30 may include an algorithm for implementing a function of recognizing the handwriting input by the user and entering the handwriting by converting into a text.

The display unit 50 may be comprised of a Liquid Crystal Display (LCD) or Organic Light Emitting Diodes (OLEDs, e.g., PMOLEDs or AMOLEDs), and outputs different display information generated in the portable terminal The display unit 50 may also operate as an input unit together with the key input unit 27 to control the portable terminal by including e.g., a capacitive, pressure sensitive, or electromagnetic touch screen.

The display unit 50 may display a text recognized from the handwriting input by the user, and, in the exemplary embodiment of the present invention, the text is assumed to be represented (entered) in the unit of pixels (px), although the text may be represented in various units of size such as points (pt), a relative unit of measurement (em), and so forth.

On the other hand, the display unit 50 includes the touch screen that uses either the capacitive technique or the electromagnetic technique, or both. Using the display unit 50, the controller 10 may recognize the user input (e.g., handwriting) through a dedicated touch pen 51 for the touch screen and to determine whether the user's handwriting is entered as a thick weight or a thin weight based on pen pressure (strong or weak pressure).

Although it is desirable for the handwriting to be entered through the touch pen for the touch screen, the touch pen may be replaced by or be used together with any alternative (e.g., the user's body part, such as, a finger). In the exemplary embodiment of the present invention, however, it is presumed that the touch pen 51 is used to enter the handwriting due to convenience of handwriting input using the touch pen 51.

The controller 10 controls general operations of the portable terminal and may control the operations of the portable terminal according to the user's input entered through the key input unit 27 or the display unit 50. The controller 10 controls a set of steps of receiving a handwriting, identifying an input size of the handwriting and a reference size, and, as a result of the identification, if the input size of the handwriting is less than the reference size, converting the handwriting into a text having the reference size. Detailed description of the controller 10 according to an exemplary embodiment of the present invention will be described below.

It will be appreciated that peripheral devices, such as Bluetooth modules, camera modules, Wireless-Fidelity (Wi-Fi) modules, Global Positional System (GPS) sensors, acceleration sensors, proximity sensors, magnetometer sensors, Digital Media Broadcasting (DMB) receivers, etc., are not shown in the block diagram of FIG. 1 and may be included in the portable terminal to provide their respective functions.

Figure 2:
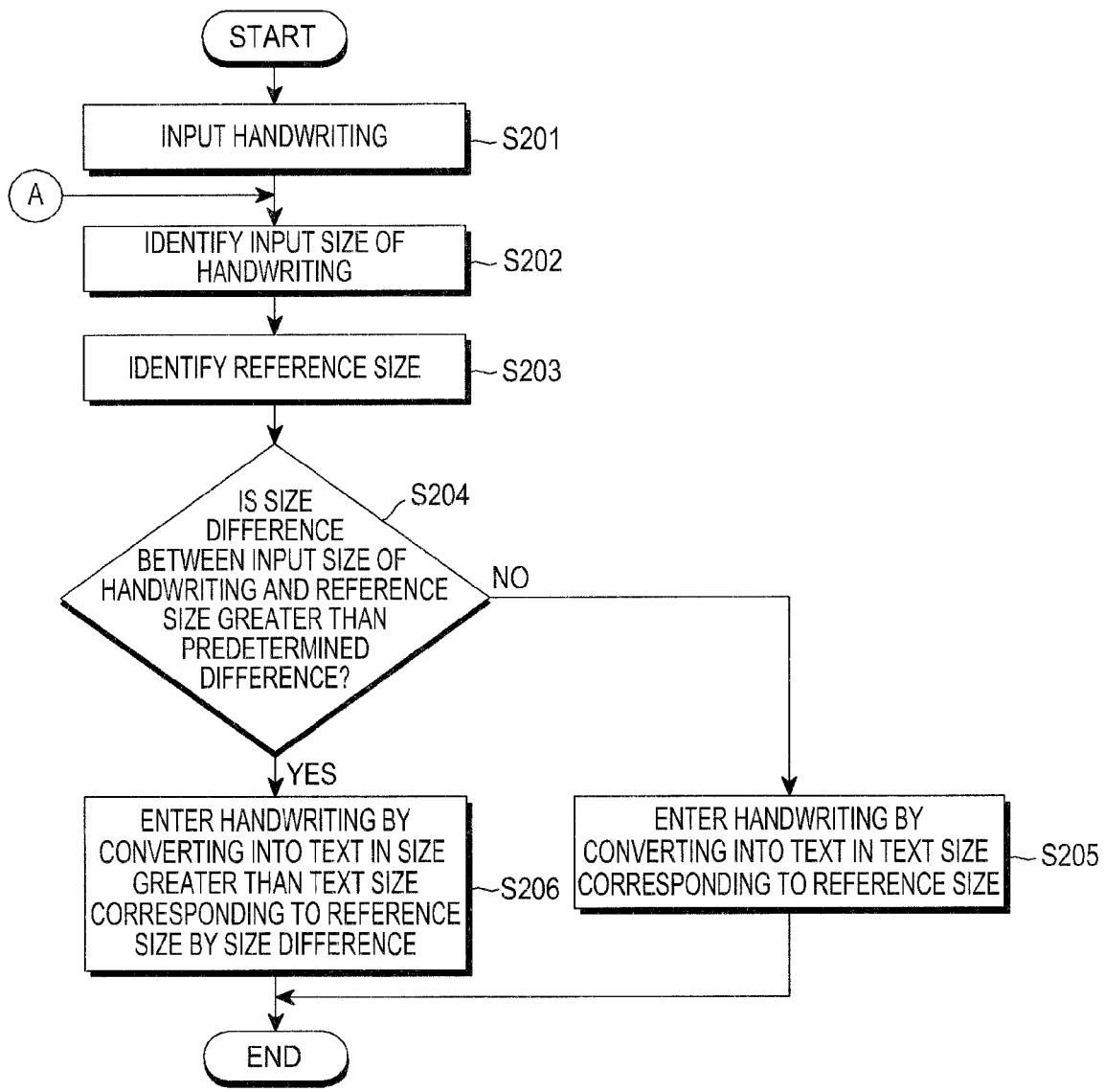
FIG. 2 is a flowchart of a method of entering a text from a handwriting according to a first exemplary embodiment of the present invention.
Figure 3A:
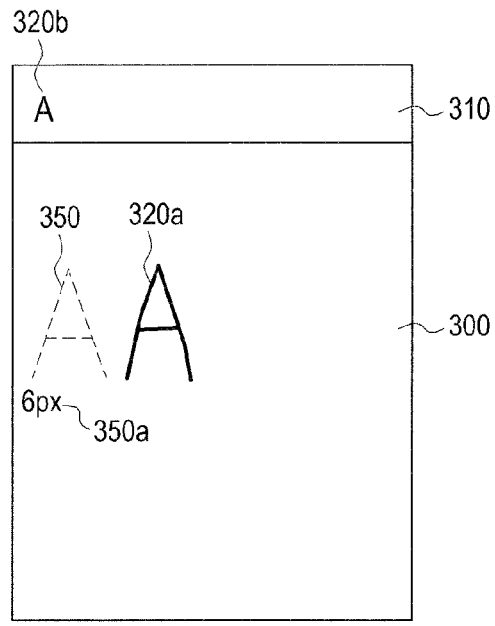
FIGS. 3A to 3C illustrate a procedure of entering a text from a handwriting according to the first exemplary embodiment of the present invention.
Figure 3B:
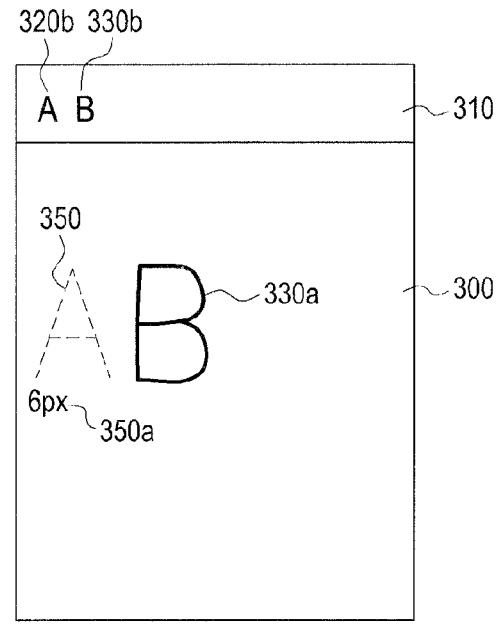
Figure 3C:
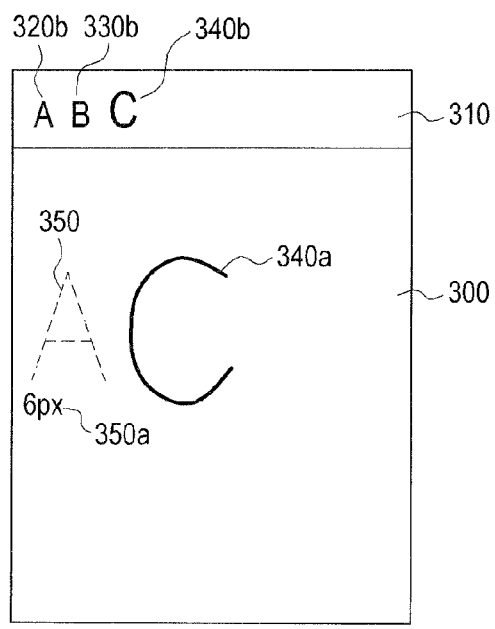

FIG. 2 is a flowchart of a method of entering a text from the handwriting according to a first exemplary embodiment of the present invention. FIGS. 3A to 3C illustrate the procedure of entering a text from the handwriting, according to the first exemplary embodiment of the present invention. The first exemplary embodiment of the present invention will now be described by referring to attached drawings.

In steps S201 to S204, if receiving handwriting in step S201, the controller 10 identifies a size of the received handwriting in step S202, identifies a reference size in step S203, and determines if a size difference between the size of the handwriting and the reference size is greater than a predetermined difference in step S204.

Referring to FIG. 3A, when recognizing the input handwriting entered into a handwriting input region 300, conventional technologies do not take into account the size of input handwriting, convert the handwriting into a text, and display the converted text in a region 310. To supplement the problem of the foregoing conventional technologies, the present disclosure describes first to third exemplary embodiments, and the first exemplary embodiment will now be described.

In a suitable mode for entering text (e.g., an email or chatting mode), the user may request to use a function to automatically convert the handwriting input with the touch pen 51 or a user's body part (e.g., a finger) into a machine readable text.

When the function to enter text via handwriting is executed, the handwriting input region 300 and the region 310 are displayed to allow the user to enter such a handwriting as represented by 320*a* of FIG. 3A. If the handwriting 320*a* is entered, the controller 10 identifies an input size (e.g., a vertical size) of the input handwriting 320*a* and a reference size 350 of FIG. 3A. The reference size 350 shown in FIGS. 3A to 3C may be displayed with various predetermined visual effects (e.g., blurring) when the user enters the handwriting, has a predetermined text size corresponding to the reference size. It will be appreciated that the text size corresponding to the reference size may vary.

For example, in a case that there is a predetermined text size (e.g., 6 px) for the reference size 350, the user may recognize in advance (predict) that, when entering the handwriting having a similar size to the reference size 350, the handwriting will be converted to a text having the reference size (e.g., 6 px). Thus, the user may be able to enter handwriting while guessing (predicting) the text size after converting the handwriting into the text by referring to the reference size 350.

On the other hand, to predict text size for a text to be converted, an exemplary embodiment of the present invention may display a text size 350*a* corresponding to the reference size 350 together with the reference size 350, as shown in FIGS. 3A to 3C. With this function, when entering handwriting in a similar size to the reference size 350, the user may predict that his/her handwriting would be converted into a text in the text size of 6 px corresponding to the size 350*a*.

At least one of the reference size 350 and the text size 350*a* may be displayed in the handwriting input region, as shown in FIGS. 3A to 3C, or may be displayed in a separate region. Furthermore, at least one of the reference size 350 and the text size 350*a* may no longer be displayed after having been displayed for a time period, or may not be displayed before being requested by the user.

On the other hand, in an exemplary embodiment of the present invention in connection with FIGS. 2 and 3A to 3C, the text size of a text converted from a handwriting may be different if the difference between the input size of the handwriting and the reference size 350 exceeds the predetermined difference or not.

Thus, the controller 10 determines whether the difference between the input size of the handwriting and the reference size 350 is greater than the predetermined difference or less than the predetermined difference, in step S204.

In step S205, if the difference between the input size of the handwriting and the reference size is less than the predetermined difference at step S204, the controller 10 enters the input handwriting by converting into a text in a text size corresponding to the reference size at step 205.

Assuming in step S204 that the predetermined difference is set up as 20%, a handwriting input having a size within 20% is converted into a text having the reference size 350. In other words, handwriting input to be in a size similar to the reference size is converted into a text having a text size corresponding to the reference size.

FIGS. 3A to 3C illustrate a procedure of entering a text from a handwriting according to the first exemplary embodiment of the present invention.

Referring to FIGS. 3A and 3B, handwritings are input by the user to be in an input size represented by 320*a* and 330*a* and having a size 18% greater than the reference size 350, which is less than the predetermined difference (e.g., 20%). In this case, the controller 10 identifies the handwritings 320*a* and 330*a*, i.e., letters 'A' and 'B', being entered, and converts the handwritings 320*a* and 330*b* into texts having the text size (e.g., 6 px) set for the reference size 350. As described above, the input handwritings are entered as texts represented by 320*b* and 330*b*, and the texts may be in a text size of 6 px.

Referring back to FIG. 2, in step S206, if the size difference between the input size of the input handwriting and the reference size is greater than the predetermined difference, the controller 10 converts the handwriting into a text having a text size greater than the text size by more than the predetermined difference.

An example of step S206 corresponds to when the input size of the user's input handwriting is greater than the reference size by more than the predetermined difference.

Referring to FIG. 3C, if the input size of the input handwriting 340*a* is about 20% greater than the reference size 350 and determined to be input in a size greater than the reference size 350 by more than the predetermined difference (e.g., 20%), the controller 10 converts the handwriting into a text having a size greater than the text size corresponding to the reference size 350.

If the input handwriting 340*a* is input to be 20% greater than the reference size 350, the controller 10 converts the handwriting into a text in a size (7.2 px) that is 20% greater than the text size (6 px) corresponding to the reference size 350a, as shown in FIG. 3C. That is, the handwriting 340a of FIG. 3C is converted into a text 340b, and the text 340b has a size of 7.2 px.

On the other hand, in a modified exemplary embodiment of the present invention, in the case of entering an input handwriting by converting into a text in a size less than or greater than the text size corresponding to the reference size, the size of the text may be rounded to make it greater or less than the text size corresponding to the reference size.

For example, as shown in FIG. 3C, in the case of entering the handwriting 340a input to be 20% greater than the reference size 350 at, the controller 10 converts the handwriting 340a into the text having a size of 7 px instead of 7.2 px.

In the first exemplary embodiment of the present invention in connection with FIGS. 2 and 3A to 3C, the user may use a function to quickly and conveniently input his/her handwriting while predicting a text size of a text to be converted from his/her handwriting by referring to the displayed reference size.

Figure 4:
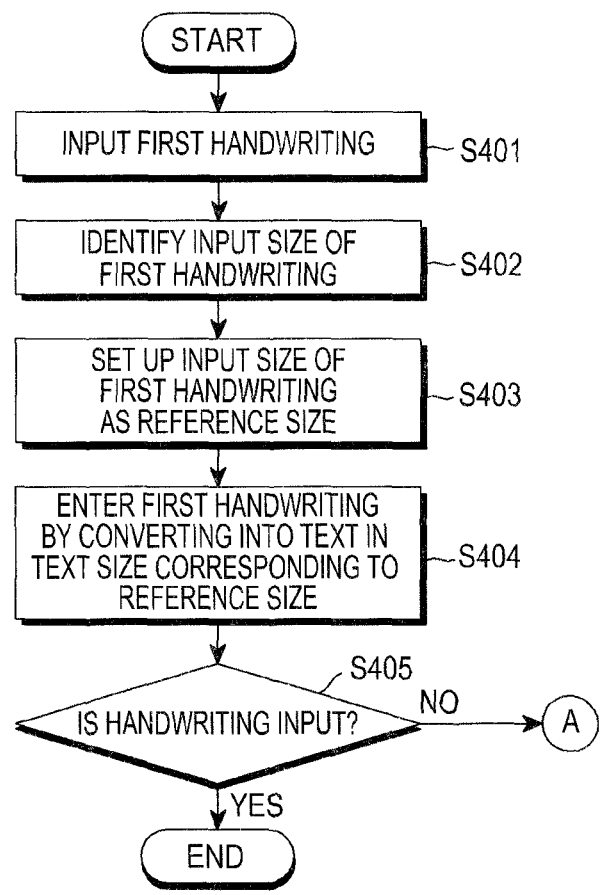
FIG. 4 is a flowchart of a method of entering a text from a handwriting according to a second exemplary embodiment of the present invention.

FIG. 4 is a flowchart of a method of entering a text from the handwriting according to a second exemplary embodiment of the present invention. FIGS. 5A to 5D are illustrations of the procedure of converting a text from a handwriting according to the second exemplary embodiment of the present invention. The second exemplary embodiment of the present invention will now be described by referring to attached drawings.

In steps S401 to S404, the controller 10 receives a first handwriting in step S401, identifies an input size of the first handwriting in step S402, sets up an input size of the handwriting as a reference size by identifying the input size of the handwriting in step S403, and converts the handwriting into a text having a text size corresponding to the reference size in step S404.

FIGS. 5A to 5D illustrate a procedure of entering a text from a handwriting according to the second exemplary embodiment of the present invention.

Figure 5A:
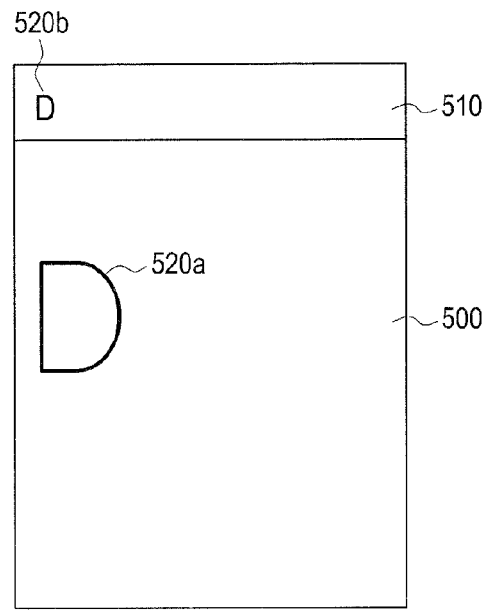
FIGS. 5A to 5D illustrate a procedure of entering a text from a handwriting according to the second exemplary embodiment of the present invention.

Referring to FIG. 5A, while in a mode that allows entering text from a handwriting (e.g., a word processing application), if a first handwriting 520a is input in a handwriting input region 500 and displayed in region 510, the controller 10 identifies an input size (e.g., vertical pixel size) of the first handwriting 520a. After that, the controller 10 sets an input size of the first handwriting as the reference size. A text size corresponding to the reference size is assumed to be automatically set up by a system setting or user setting and to have the text size of 6 px, as described below.

Then, after setting up the originally input handwriting 520a as the reference size, the controller 10 converts the handwriting 520a into a text having the text size (e.g., 6 px) corresponding to the reference size.

Referring back to FIG. 4, in step S405, the controller 10 confirms if an additional handwriting is input since the first handwriting was input, and, if so, returns to step S202 of FIG. 2 to enter a text from the additional handwriting based on an input size of the additional handwriting.

The first exemplary embodiment of the present invention in connection with FIGS. 2 and 3A to 3C is related to a predetermined reference size and the second exemplary embodiment of the present invention in connection with FIGS. 4 and 5A to 5D is related to where the reference size is determined from the first handwriting. Thus, although steps after S405 may be almost understood by recalling what was described with reference to FIG. 2, they will be briefly described again as follows.

If the first handwriting 520a is used to set up the reference size, subsequent handwritings are entered by converting handwriting into texts in different sizes based on the size differences between the reference size and input sizes of the subsequent handwritings.

Figure 5B:
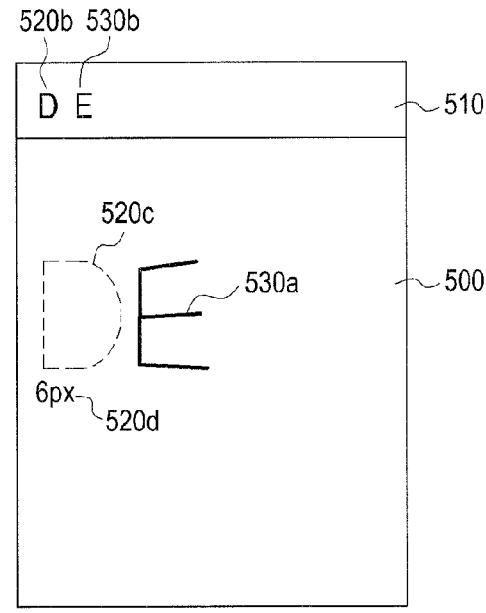

For example, FIG. 5B shows an example having a size difference between the reference size 520c and an input size of an input handwriting 530a that is less than a predetermined difference (e.g., 20%). Thus, the text 530b to be converted from the input handwriting 530a may be in the same text size as that of a text 520b.

Figure 5C:
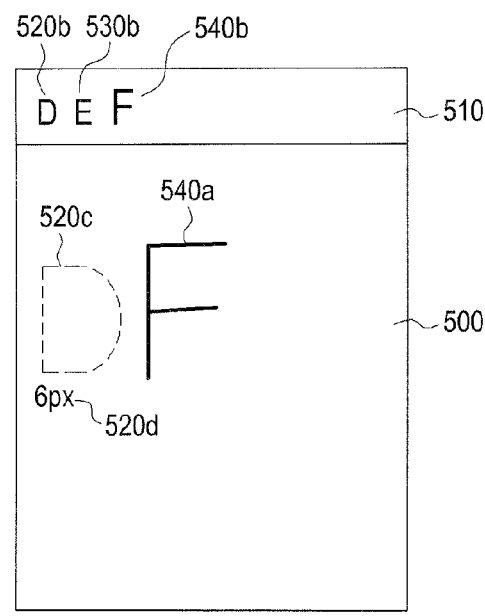
Figure 5D:
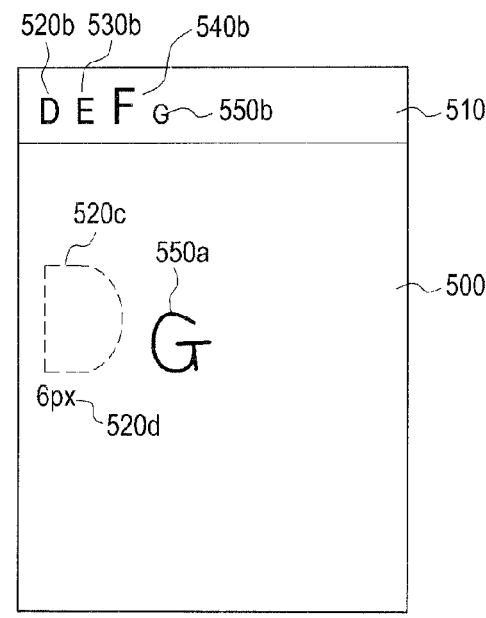

As another example, FIGS. 5C and 5D show a case that differences between the reference size 520c and input sizes of input handwritings 540a and 550a are greater than the predetermined difference.

Referring to FIG. 5C, the input handwriting 540a is input to be 22% greater than the reference size 520c, which is more than the predetermined difference (e.g., 20%), the handwriting 540a may be entered by converting into a text 540b in a size (e.g., 7.32 px) 22% greater than the text size corresponding to the reference size. As described above, in the exemplary embodiment of the present invention, the size of text 540b may be rounded to a text size of 7 px, instead of 7.32 px as calculated.

Referring to FIG. 5D, the input handwriting 550a is input to be 20% less than the reference size 520c, which is more than the predetermined difference (e.g., 20%), the handwriting 550a may be entered by converting into a text 550b in a size (e.g., 4.8 px) 20% less than the text size corresponding to the reference size. As described above, in the exemplary embodiment of the present invention, the size of text 550b may be rounded to a text size of 5 px, instead of 4.8 px as calculated.

That is, in FIGS. 5B to 5D, when the handwriting is input, the reference size 520c may be displayed as in the first exemplary embodiment of the present invention, but the reference size 520c is set up based on the first handwriting 520a. Thus, as shown in FIGS. 5B to 5D, in the second exemplary embodiment of the present invention, the reference size may have a similar form (or the same form) to the first handwriting 520a, and may also be displayed with the corresponding text size as represented by 520d.

Figure 6:
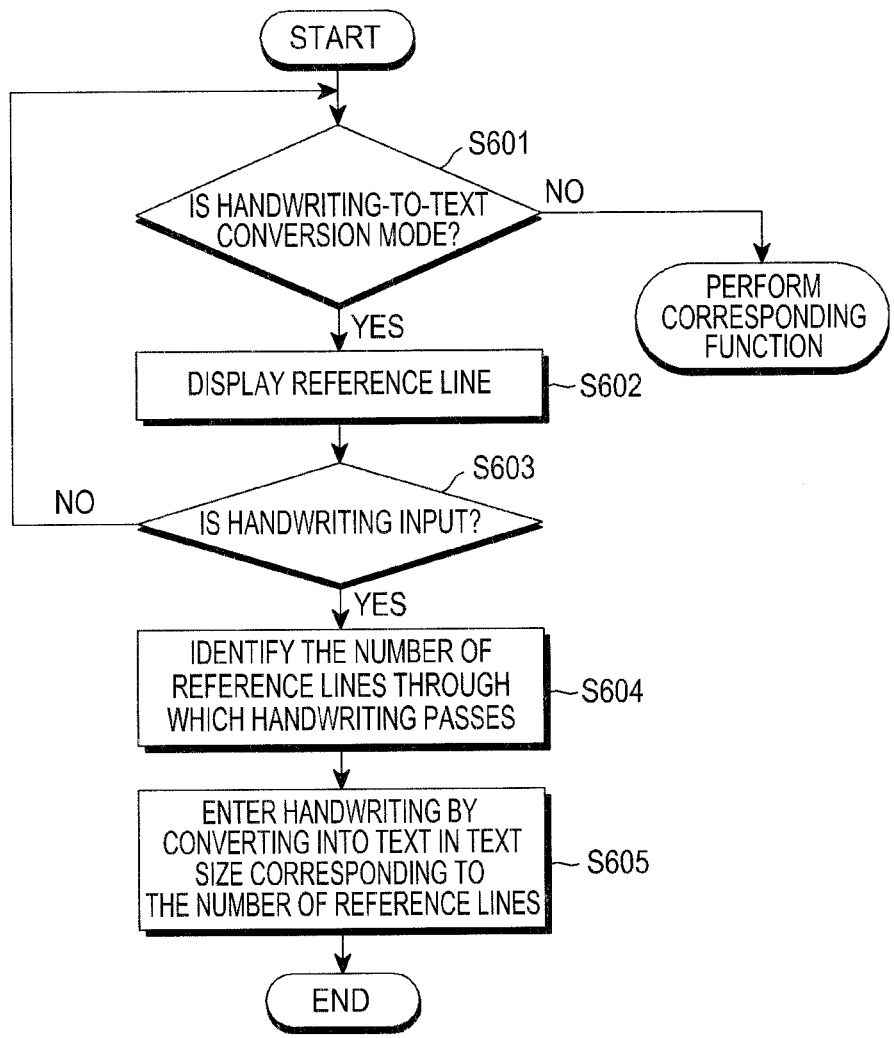
FIG. 6 is a flowchart of a procedure of entering a text from a handwriting according to a third exemplary embodiment of the present invention.

FIG. 6 is a flowchart of a procedure of entering a text from a handwriting according to a third exemplary embodiment of the present invention. FIGS. 7A to 7D are illustrations of the procedure of entering a text from a handwriting according to the third exemplary embodiment of the present invention. The third exemplary embodiment of the present invention will now be described by referring to attached drawings.

Referring to FIG. 6, in steps S601 and S602, the controller 10 displays one or more reference lines in a handwriting input region 700 if confirming that it enters into a handwriting-to-text conversion mode.

Figure 7A:
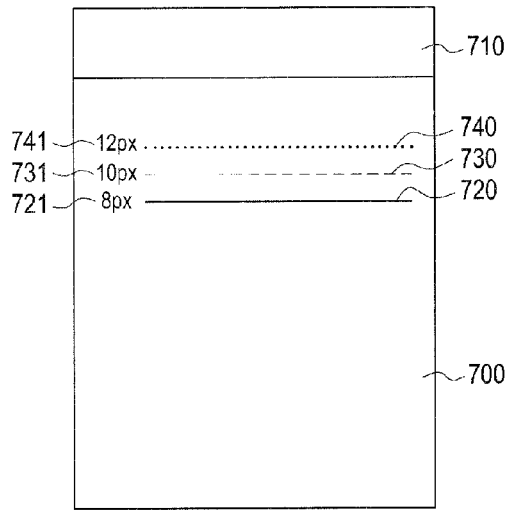
FIGS. 7A to 7D illustrate a procedure of entering a text from handwriting according to the third exemplary embodiment of the present invention.

If confirming it enters into the handwriting-to-text conversion mode, such as from a request to run an application (or a menu) for automatically converting an input handwriting to a text, the controller 10 displays the handwriting input region 700 and a region 710 for displaying a text converted from a handwriting as illustrated in FIG. 7A. After that, the controller 10 displays one or more reference lines (e.g., 720 to 740) in the handwriting input region 700. The controller 10 may also display one or more reference lines together with one or more text sizes (e.g., 721 to 741) corresponding to the one or more reference lines, respectively, according to a modified exemplary embodiment of the present invention.

Figure 7B:
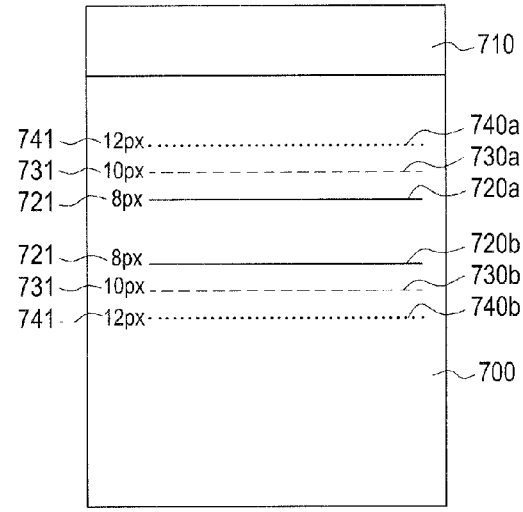

On the other hand, in the exemplary embodiment of the present invention, each reference line may consist of a pair of upper and lower end reference lines, which may be displayed with the corresponding text size. Referring to FIG. 7B, the reference line consisting of a pair of upper and lower end reference lines 720a and 720b may be displayed with the corresponding text size 721, e.g., 8 px. The reference line consisting of a pair of upper and lower end reference lines 730a and 730b may be displayed with the corresponding text size 731, e.g., 10 px, and the reference line consisting of a pair of upper and lower end reference lines 740a and 740b may be displayed with the corresponding text size 741, e.g., 12 px.

FIGS. 7A to 7D illustrate a procedure of entering a text from a handwriting according to the third exemplary embodiment of the present invention.

Referring to FIG. 7B, in the exemplary embodiment in which a reference line consist of a pair of upper and lower end reference lines, the user may readily predict which size would be for a text converted from a handwriting by inputting the handwriting between the upper and lower end reference lines.

For example, by inputting his/her handwriting between the upper and lower end reference lines 720a and 720b, the user may predict that his/her handwriting would be converted to a text in the text size of 8 px; by inputting his/her handwriting between the upper and lower end reference lines 730a and 730b, the user may predict that his/her handwriting would be converted to a text in the text size of 10 px; and by inputting his/her handwriting between the upper and lower end reference lines 740a and 740b, the user may predict that his/her handwriting would be converted to a text in the text size of 12 px.

Furthermore, as illustrated in FIGS. 7A-7D, the reference lines displayed in the exemplary embodiment of the present invention to be visually distinctive in order for the user to easily distinguish (identify) each reference line. For example, for each reference line, a different color or type may be assigned.

In steps S603 to S605, when a handwriting is input in step S603, the controller 10 identifies the number of reference lines through which the handwriting intersects in step S604, and converts the handwriting into a text in a text size corresponding to the number of reference lines through which the input handwriting passes in step S605.

As described above, the user may predict which text size would be for a text converted from the handwriting by referring to the reference lines displayed in the handwriting input region 700.

Figure 7C:
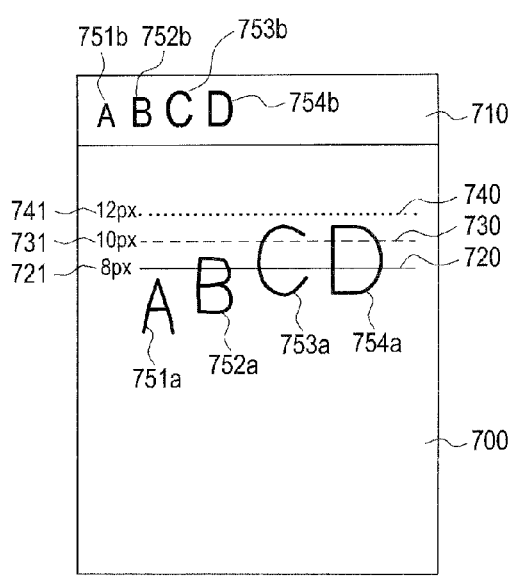

Specifically, referring to FIG. 7C, the user may input such a handwriting 751a not to pass the reference line 720; input such a handwriting 752a to pass only the reference line 720; and input such handwritings 753a and 754a to pass the reference lines 720 and 730.

Referring to FIG. 7C, with the reference lines 720 to 740 displayed, if such handwritings as represented by 751a to 754a are input, the controller 10 converts the handwritings to texts having text sizes corresponding to the number of the reference lines through which the handwritings pass, respectively. Again, the controller 10 converts the input into a text in the greater text size as the input handwriting intersects more of the reference lines.

For example, the controller 10 converts the handwriting 751a, which does not pass any reference lines, by converting into a text 751b having the text size of 8 px. As a result, the text 751b has the text size of 8 px.

As another example, the controller 10 converts the handwriting 752a, which passes only the reference line 720, by converting into a text 752b having the text size of 10 px. As a result, the text 752b has the text size of 10 px.

As yet another example, the controller 10 converts handwritings 753a and 754a, which both pass two reference lines 720 and 730, by converting into texts 753b and 754b having the text size of 12 px. As a result, the texts 753b and 754b have the text size of 12 px.

Figure 7D:
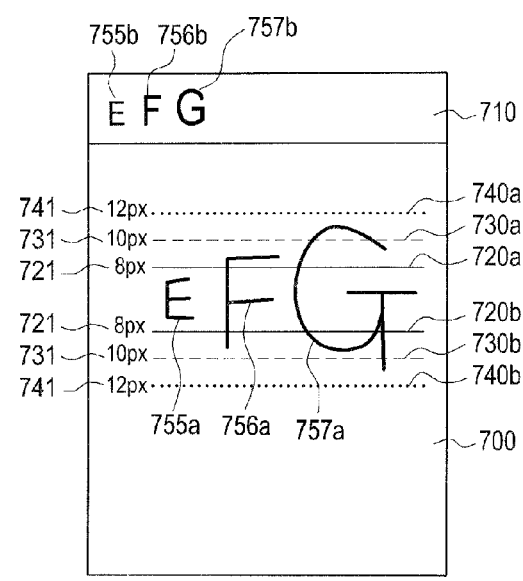

Referring back to steps S603 to S605 and with reference to FIG. 7D, a handwriting 755a input between reference lines 720a and 720b without passing the reference lines 720a and 720b is converted into such a text as represented by 755b having the text size of 8 px.

Also, a handwriting 756a input between reference lines 730a and 730b, which intersects only one pair of reference lines 720a and 720b, is converted into such a text as represented by 756b having the text size of 10 px. Furthermore, a handwriting 757a input between reference lines 740a and 740b, which intersects two pairs of reference lines 720a and 720b and 730a and 730b, is converted into such a text as represented by 757b having the text size of 12 px.

According to the foregoing exemplary embodiments of the present invention, when inputting a text from his/her handwriting input via a pen, the user may enjoy the convenience of setting up a size of the text.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of displaying handwriting in a portable terminal, the method comprising:
   receiving a first handwriting;
   identifying an input size of the first handwriting and a reference size;
   converting the first handwriting into a text;
   determining a size of the text based on a comparison of the input size of the first handwriting and the reference size; and
   in response to the converting of the first handwriting, displaying the text with the determined size.

2. The method of claim 1, wherein the determining of the size of the text comprises, if a size difference between the input size of the first handwriting and the reference size is greater than a predetermined difference, determining the size of the text to be a text size greater than the reference size by more than the predetermined difference.

3. The method of claim 1, wherein the receiving of the first handwriting comprises, when a touch for inputting the first handwriting is detected, displaying the reference image having the reference size.

4. The method of claim 1, wherein the determining of the size of the text comprises, if a size difference between the input size of the first handwriting and the reference size is less than a predetermined difference, determining the size of the text to be the reference size.

5. A method of displaying a handwriting in a portable terminal, the method comprising:
   receiving a first handwriting;
   setting an input size of the first handwriting as a reference size;
   converting the first handwriting into a first text having a first text size;
   in response to the converting of the first handwriting into the first text, displaying the first text having the first text size;

after the displaying of the first text, receiving a second handwriting input;
converting the second handwriting into a second text;
determining a second text size based on a comparison of an input size of the second handwriting and the reference size; and
in response to the converting of the second handwriting into the second text, displaying the second text with the second text size adjacent to the first text.

6. The method of claim 5, wherein the determining of the second text size comprises, if a size difference between the input size of the second handwriting and the reference size is greater than a predetermined difference, determining the second text size to be a text size greater than the reference size by more than the predetermined difference.

7. The method of claim 5, wherein the receiving of the second handwriting input comprises displaying a reference image having the reference size.

8. The method of claim 5, wherein the determining of the second text size comprises, if a size difference between the input size of the second handwriting and the reference size is less than a predetermined difference, determining the second text size to be the reference size.

9. A method of displaying a handwriting in a portable terminal, the method comprising:
if a handwriting-to-text conversion mode is entered, displaying one or more reference lines in a handwriting input region;
receiving a handwriting and identifying a number of the reference lines that the handwriting intersects;
converting the handwriting into a text;
determining a size of text based on the number of the reference lines that the handwriting intersects; and
in response to the converting of the handwriting, displaying the text with the determined size.

10. The method of claim 9, wherein the displaying of the one or more reference lines comprises,
when the handwriting-to-text conversion mode is entered, displaying the one or more reference lines in the handwriting input region; and
displaying a text size adjacent to each of the one or more reference lines.

11. The method of claim 9, wherein each of the one or more reference lines is displayed to be visually distinctive.

12. The method of claim 9, wherein each of the one or more reference lines consists of a pair of upper and lower end reference lines.

13. A non-transitory computer readable medium storing a computer program of instructions configured to be readable by at least one processor for instructing the at least one processor to execute a computer process for performing the method as recited in claim 1.

14. A non-transitory computer readable medium storing a computer program of instructions configured to be readable by at least one processor for instructing the at least one processor to execute a computer process for performing the method as recited in claim 5.

15. A non-transitory computer readable medium storing a computer program of instructions configured to be readable by at least one processor for instructing the at least one processor to execute a computer process for performing the method as recited in claim 9.

16. The method of claim 1, wherein the reference size is set as a predetermined size or is set as an input size of a second handwriting received by the portable terminal before the first handwriting is received.

17. A portable terminal for displaying handwriting comprising:
a touch screen; and
a processor configured to:
receive a first handwriting through the touch screen,
identify an input size of the first handwriting and a reference size,
convert the first handwriting into a text,
determine a size of the text based on a comparison of the input size of the first handwriting and the reference size, and
display the text with the determined size on the touch screen in response to the converting of the first handwriting.

18. The portable terminal of claim 17, wherein the processor is further configured to determine the size of the text to be a text size greater than the reference size by more than a predetermined difference if a size difference between the input size of the first handwriting and the reference size is greater than the predetermined difference.

19. The portable terminal of claim 17, wherein the processor is further configured to display the reference image having the reference size on the touch screen when a touch for inputting the first handwriting is detected through the touch screen.

20. The portable terminal of claim 17, wherein the processor is further configured to determine the size of the text to be the reference size if a size difference between the input size of the first handwriting and the reference size is less than a predetermined difference.

21. The portable terminal of claim 17, wherein the reference size is set as a predetermined size or is set as an input size of a second handwriting received by the portable terminal before the first handwriting is received.

22. A portable terminal for displaying handwriting comprises:
a touch screen; and
a processor configured to:
receive a first handwriting through the touch screen,
set an input size of the first handwriting as a reference size,
convert the first handwriting into a first text having a first text size,
display the first text having the first text size on the touch screen in response to the converting of the first handwriting into the first text,
receive a second handwriting input through the touch screen after the displaying of the first text,
convert the second handwriting into a second text,
determine a second text size based on a comparison of an input size of the second handwriting and the reference size, and
display the second text with the second text size adjacent to the first text on the touch screen in response to the converting of the second handwriting into the second text.

23. The portable terminal of claim 22, wherein the processor is further configured to determine the second text size to be a text size greater than the reference size by more than a predetermined difference if a size difference between the input size of the second handwriting and the reference size is greater than the predetermined difference.

24. The portable terminal of claim 22, wherein the processor is further configured to display a reference image having the reference size on the touch screen.

25. The portable terminal of claim 22, wherein the processor is further configured to determine the second text size to be the reference size if a size difference between the input size of the second handwriting and the reference size is less than a predetermined difference.

26. A portable terminal for displaying handwriting comprises:
   a touch screen; and
   a processor configured to:
      display one or more reference lines in a handwriting input region if a handwriting-to-text conversion mode is entered,
      receive a handwriting through the touch screen,
      identify a number of the reference lines that the handwriting intersects,
      convert the handwriting into a text,
      determine a size of text based on the number of the reference lines that the handwriting intersects, and
      display the text with the determined size on the touch screen in response to the converting of the handwriting.

27. The portable terminal of claim 26, wherein the processor is further configured to:
   display the one or more reference lines in the handwriting input region when the handwriting-to-text conversion mode is entered, and
   display a text size adjacent to each of the one or more reference lines.

28. The portable terminal of claim 26, wherein each of the one or more reference lines is displayed to be visually distinctive.

29. The portable terminal of claim 26, wherein each of the one or more reference lines consists of a pair of upper and lower end reference lines.

* * * * *